United States Patent
Shipman (10) Patent No.: US 7,385,936 B2
(45) Date of Patent: Jun. 10, 2008

(54) DESIGN OF COMMUNICATIONS NETWORKS

(75) Inventor: Robert A Shipman, Ipswich (GB)

(73) Assignee: British Telecommunications public) limited company, London (GB)

( * ) Notice: Subject to any disclaimer, the term of this patent is extended or adjusted under 35 U.S.C. 154(b) by 831 days.

(21) Appl. No.: 10/363,776

(22) PCT Filed: Sep. 14, 2001

(86) PCT No.: PCT/GB01/04136

§ 371 (c)(1), (2), (4) Date: Mar. 7, 2003

(87) PCT Pub. No.: WO02/23806

PCT Pub. Date: Mar. 21, 2002

(65) Prior Publication Data

US 2003/0181210 A1     Sep. 25, 2003

(30) Foreign Application Priority Data

Sep. 15, 2000   (GB) .................. 0022743.9
Jan. 9, 2001    (EP) .................. 01300152

(51) Int. Cl.
*H04L 12/28* (2006.01)

(52) U.S. Cl. ............... 370/254; 370/252; 703/1; 703/3

(58) Field of Classification Search ........... 370/228, 370/222, 236, 338, 352, 229, 230, 231, 230.1, 370/235, 254, 252; 703/14, 1, 2, 3; 455/446
See application file for complete search history.

(56) References Cited

U.S. PATENT DOCUMENTS 4,694,411 A * 9/1987 Burrows ............... 703/14
5,381,404 A * 1/1995 Sugano et al. ............... 370/238
5,787,161 A * 7/1998 Rayes et al. ........... 379/112.03
5,809,282 A   9/1998 Cooper et al.
5,874,955 A   2/1999 Rogowitz et al.

(Continued)

OTHER PUBLICATIONS

Stiffler et al., "An AI/Or Hybrid Expert System for Data Network Design", Proceedings of the International Conference on Systems, Man, and Cybernetics, Los Angeles, Nov. 4-7, 1990, New York, IEEE, US, Nov. 4, 1990, pp. 307-313.

(Continued)

*Primary Examiner*—Ricky Q. Ngo
*Assistant Examiner*—Kan Yuen
(74) *Attorney, Agent, or Firm*—Nixon & Vanderhye P.C.

(57) ABSTRACT

At least a part of a communications network is designed beginning with an initial network design, a set of traffic handling requirements and an initial set of design rules. Each rule includes a condition portion and an action portion and at least one such rule includes a portion expressed in terms of at least one variable parameter. An iterative procedure is implemented to evolve both a network design and a set of design rules including variations to rules from the initial rule set. A population of rule sets is generated with each rule set using a different combination of assigned parameter values. For each rule set in the population of rule sets, rules for which the condition portion is satisfied are applied to generate a modified network design. Measures of performance, including cost of each modified design are determined through simulation of the operation of the design on the basis of the traffic handling requirements and the performance and cost of different designs compared. A preferred design then forms the basis for further modified network designs and the particular rule set that generated the preferred design forms the basis of a new rule set population in the next iteration.

20 Claims, 6 Drawing Sheets

U.S. PATENT DOCUMENTS

| | | | | |
|---|---|---|---|---|
| 5,877,970 | A * | 3/1999 | Nesbit et al. | 703/1 |
| 6,224,249 | B1 * | 5/2001 | Ozawa et al. | 703/1 |
| 6,404,744 | B1 * | 6/2002 | Saito | 370/255 |
| 6,418,123 | B1 * | 7/2002 | Kawakami et al. | 370/254 |
| 6,614,781 | B1 * | 9/2003 | Elliott et al. | 370/352 |
| 6,829,216 | B1 * | 12/2004 | Nakata | 370/228 |
| 6,836,803 | B1 * | 12/2004 | Swartz et al. | 709/227 |
| 7,145,869 | B1 * | 12/2006 | Kadambi et al. | 370/229 |
| 2003/0181210 | A1 * | 9/2003 | Shipman | 455/446 |

OTHER PUBLICATIONS

Ruston et al., "A Rule-Based System for Packet Radio Network Design", Technology: Emerging or Converging?, Ottawa, Apr. 23-27, 1989, Proceedings of the Annual Joint Conference of the Computer and Communications Societies, Washington, IEEE Comp. Soc. Press, US, vol. 2 Conf. 8, Apr. 23, 1989, pp. 512-519.

* cited by examiner

DESIGN OF COMMUNICATIONS NETWORKS

This application is the U.S. national phase of international application PCT/GB01/04136 filed 14 Sep. 2001 which designated the U.S.

BACKGROUND

1. Technical Field

This invention relates to the design of communications networks and in particular to methods and apparatus for evolving a design for a network using a technique involving evolution of design rules.

2. Related Art

Design of a network architecture and configuration is a complex task, especially in respect of large data networks having, or likely to require, a large number of nodes and interconnecting links.

A wide range of different systems have been devised to assist in the design of network architectures and configurations. A number of such systems are based upon the idea of using an expert system comprising a database of rules to be applied to a particular network design problem, be it the design of a new network or the modification of an existing network to meet a set of customer requirements, for example a rising demand for peak traffic capacity.

International patent application PCT/US96/09899 of Cooper et al. describes a system for selecting options for modifying a network architecture in accordance with user preferences and predetermined traffic requirements, using a knowledge base of rules. Beginning with a baseline network architecture, rules from the knowledge base are used to select different categories of modification that may be made to the baseline architecture, at the same time satisfying the user preferences, and a network simulator simulates operation and performance of modified networks in each category according to the predetermined traffic requirements. Particular modification options in one or more categories are then selected using rules from the knowledge base, taking account of performance results from the network simulations and the user preferences. Further simulation of each of the selected modification options is then used to assess their performance and cost relative to the performance and cost of the baseline architecture and so produce a ranked list of options for a modified network architecture.

While a great deal of experience may be embodied a knowledge base of rules for use in such systems, the resultant options for modification of a network are nevertheless limited by the rule set used to devise them.

BRIEF SUMMARY

According to a first aspect of the present invention there is provided a network designing tool for use in designing at least a portion of a communications network, having:

an input for receiving an initial network design and a set of traffic requirements;

a store for storing at least one network design rule;

a rule generator for generating a population of rule sets, each rule set comprising at least one network design rule;

a network modifier for applying rule sets generated by the rule generator to create at least one modified network design;

performance measurement means for calculating at least one measure of network performance in respect of a modified network design when carrying traffic as defined by an input set of traffic requirements; and an evaluator for comparing modified network designs using respective performance measures calculated by the performance measurement means, for selecting at least one preferred network design satisfying predetermined performance criteria and for identifying a respective rule set used by the network modifier to create said at least one preferred network design;

wherein the rule generator is arranged to receive, from the evaluator, the identity of at least one rule set used to create a preferred network design and to generate a new population of rule sets comprising rules derived from said at least one identified rule set, and wherein the network modifier is arranged to apply rule sets from said new population of rule sets to create further modifications of said at least one preferred network design for input to the performance measurement means and for evaluation by the evaluator.

According to this first aspect of the present invention, beginning with an initial network design and a set of traffic handling requirements, the network designing tool is able to evolve a modification to the initial design that not only satisfies the traffic handling requirements but also improves the design with respect to predetermined network performance criteria. Such performance criteria may be expressed in terms of quality of service or cost measures, for example measures relating to the proportion of successful data calls, the proportion of data packets lost in an Internet Protocol (IP) network, or provision costs associated with providing new network components such as nodes and links or with network rearrangements.

Significantly, rather than evolving a network design solely on the basis of a fixed rule set, as in known network design tools, embodiments of the present invention are able to evolve a set of network design rules found to be most effective in generating network designs that optimise the performance measures, for example minimising the network provision costs. By varying the network design rules, certain types of network modification that may not have been possible with a fixed rule set may be considered, potentially leading to a particularly successful network design.

An initial network design may comprise a specification of components forming the whole or a selected portion of an existing network that needs to be altered, or the initial network design may comprise simply a list of specific geographical sites suitable for siting network equipment forming the basis for a new network or an extension or enhancement to an existing network.

According to a preferred aspect of the present invention, a network design rule comprises at least one condition portion and at least one action portion with at least one of said portions being defined in terms of at least one variable parameter. A population of rule sets generated by the rule generator includes rules characterised in having different values assigned to said at least one variable parameter.

Rules defined using variable parameters in either a condition portion or an action portion of the rule enable rules to be represented and, using that representation, varied to generate a population of rule sets simply by representing the value of each variable parameter. Certain parameter values may be found to be particularly effective in generating a network design of low cost or of higher reliability than other values. The network designer tool of the present invention enables such parameter values to be found.

According to a further preferred aspect of the present invention, a rule comprises a plurality of condition portions, at least one action portion and a variable weighting parameter associated with each of said plurality of condition portions. In tha case, rule sets of the population of rules sets generated by the rule generator comprise rules having different values assigned to the variable weighting parameter.

A weighting parameter may also be represented in a similar way to a variable parameter within a rule portion. Indeed, rules comprising variable parameters within rule portions may be combined with rules having variable weighting parameters assigned to condition portions, each such parameter being represented using the same representation scheme. In this way, subtle variations to a rule set may be generated to explore the relative importance of certain network characteristics when selecting rules for use in modifying a network design. This is a particularly powerful technique not available in known systems without using a great many predetermined rules.

In a preferred representation scheme, the rule generator is arranged to generate a representation of each network design rule in a rule set, the representation comprising a binary bit string of predetermined length. The assigned value of each variable parameter of the represented network design rule is represented by a predefined sub-section of the bit string so that a population of rule sets comprises a set of said binary bit strings in which selected bits have been altered.

Where rules have weighting parameters assigned to rule condition portions, the rule representation preferably comprises a binary bit string of predetermined length, the assigned value of the weighting parameter being represented by a predefined sub-section of the bit string so that a population of rule sets comprises a set of said binary bit strings in which selected bits in the weighting parameter sub-section have been altered.

In another preferred aspect of the present invention, a rule set includes at least one fixed rule and the rule generator is arranged to generate a representation of a fixed rule, the representation comprising a binary bit string of predetermined length for representing a distinct rule identifier assigned to the rule. A population of rule sets then comprises a set of said binary bit strings in which selected bits have been altered to identify different rules.

Besides representing rules by a simple identification scheme, classifier systems or other techniques may be used to model a rule set to enable rule set populations to be generated and to explore the effect of the possible rules on network design in an iterative evolution procedure.

According to a second aspect of the present invention there is provided a method of designing at least a portion of a communications network, the method comprising the steps of:

(i) inputting an initial network design comprising at least the identity of a site for locating a network node;

(ii) inputting predetermined traffic requirements relating to a network to be designed;

(iii) inputting a rule set containing at least one rule for modifying a network design, said rule set including at least one rule comprising at least one condition portion and at least one action portion with at least one of said portions being defined in terms of at least one variable parameter;

(iv) generating an initial population of rule sets including rules characterised in having different values assigned to said at least one variable parameter;

(v) for each rule set in said population of rule sets, generating a corresponding modified network design by applying each rule from the rule set to components of the initial network design for which the respective rule conditions are satisfied;

(vi) calculating at least one measure of network performance in respect of each modified network design generated at step (v) when carrying traffic as defined by traffic requirements input at step (ii);

(vii) evaluating the modified network designs from step (v), comparing them on the basis of said at least one respective measure of performance from step (vi) to identify at least one preferred network design and identifying the corresponding network design rules used to create said at least one preferred network design in step (v);

(viii) generating a new population of rule sets, derived from at least one network design rule identified in step (vii);

(ix) repeating steps (v) to (viii), wherein at step (v) said at least one preferred network design from step (vii) is modified in place of the initial network design.

BRIEF DESCRIPTION OF THE DRAWINGS

Further aspects, features and advantages of the present invention will be apparent from the following description of preferred embodiments of the invention, described by way of example only, which refers to the accompanying drawings of which.

DETAILED DESCRIPTION OF EXEMPLARY EMBODIMENTS

Overview

In order to accommodate the increasing volume of IP traffic, particularly the volume of dial-up Internet calls, network design is becoming an increasingly dynamic issue. As a result, the design of networks is evolving in accordance with traffic demands. Typically the nature of such evolution involves use of a network simulator, which simulates projected peak demand for calls. Network simulators are used to provide a variety of information for particular network arrangements; in the present invention a network simulator is used to evaluate the performance of the network arrangement—i.e. how, and whether, the network devices comprising the network can cope with a predetermined demand.

Figure 1:
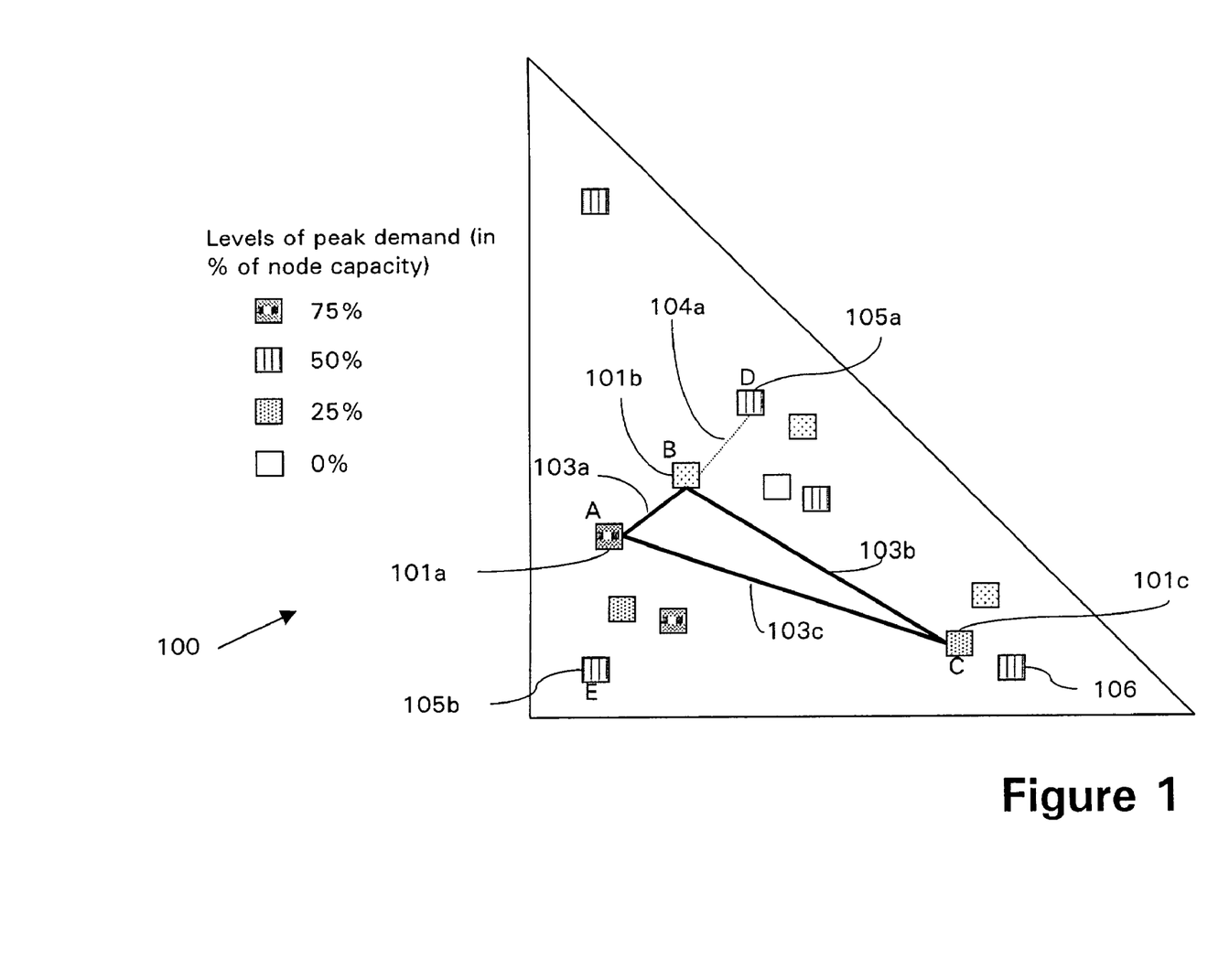
FIG. 1 is a schematic diagram showing a network arrangement to which the present invention is applied.

Referring to FIG. 1, a typical simple communications network arrangement is shown for use in routing IP traffic between points within a geographical area 100. The network of FIG. 1 will be referred to in describing the operation of preferred embodiments of the present invention below. FIG. 1 shows three so called "core" nodes A, B and C located at sites 101*a*, 101*b* and 101*c* respectively. Core nodes A, B and C are fully interconnected by links 103*a*, 103*b* and 103*c*. Two so called "access" nodes D and E are also shown located at sites 105*a* and 105*b* respectively, each access node being linked to its nearest respective core node, for example access node D to core node B by means of link 104a. FIG. 1 also shows sites 106 representative of further points of access to the network, though without collocated access nodes. However, sites 106 represent potential geographical locations for new access or core nodes that may need to be provided in order for the network to meet increasing traffic handling requirements. Each of the sites 105a, 105b and points of access 106 represent points of accumulated demand for access to the network from particular geographical areas. The accumulated peak level of demand for data calls originating within the local area of each site 105a, 105b and 106 is illustrated in FIG. 1 by use of different shadings, representative in this example of four bands of peak traffic demand.

Figure 2:
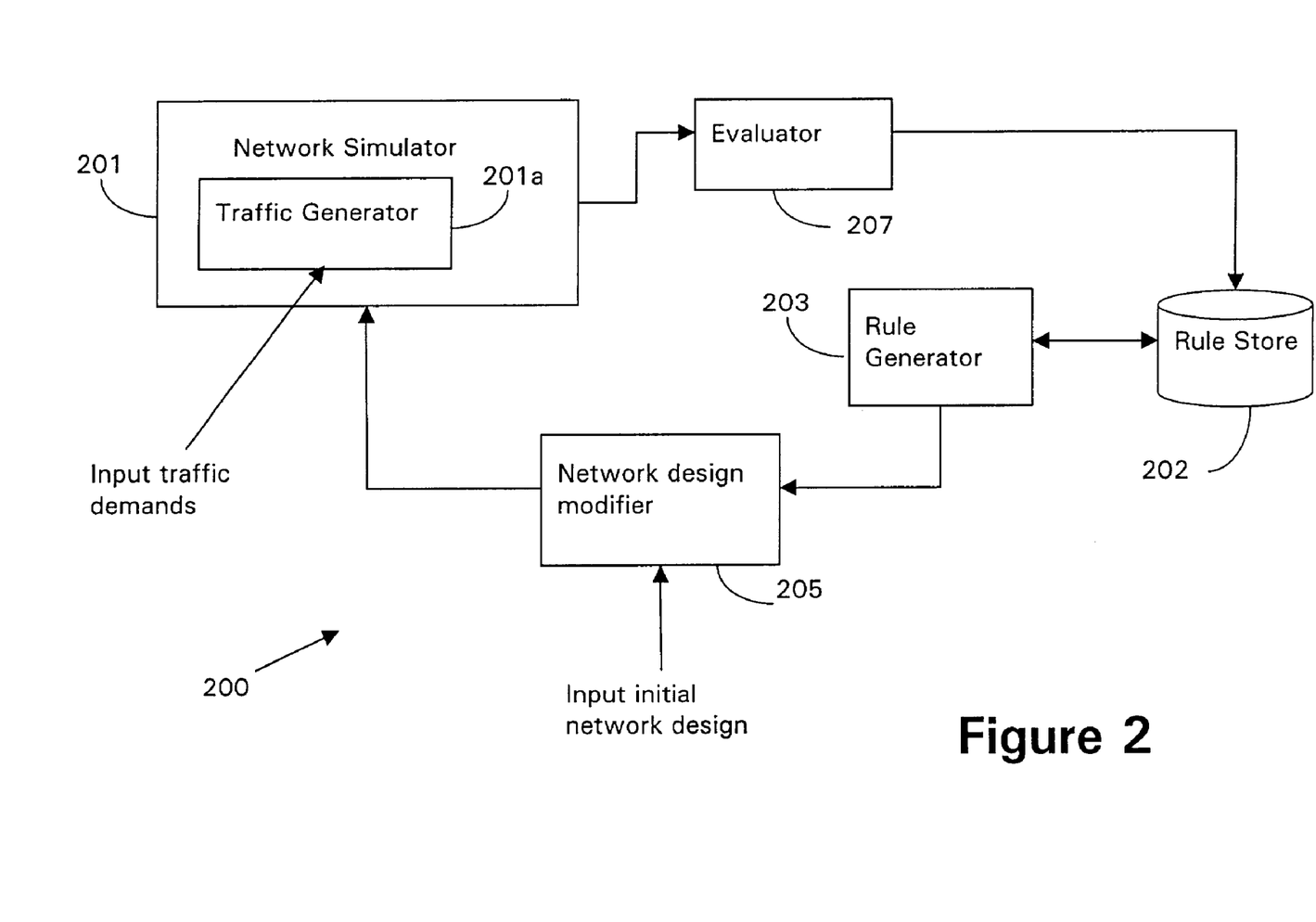
FIG. 2 is a schematic block diagram showing apparatus of a network planning tool according to the present invention.

In an embodiment of the present invention, a network simulator 201, shown in FIG. 2 of the accompanying drawings, simulates this network arrangement. The embodiment of the present invention, generally referred to as a network planning tool 200, additionally comprises a rule generator 203, network design modifier 205 for modifying network arrangement, evaluator 207 for evaluating cost associated with the modified arrangement and rule generator 203 for adapting parameters characterising the rules. Essentially these components interoperate as follows:

Referring to FIG. 2, components of a network planning tool 200 are shown according to preferred embodiments of the present invention. The network planning tool 200 includes a rule store 202, a rule generator 203, a network design modifier 205, a network simulator 201 and an evaluator 207. Operation of each of these components will be described in more detail below. However, in overview, the rule store 202 stores, or is arranged with access to at least one planning rule for use in determining the design of a new network or modifications to an existing network. The rule generator 203 receives rules from the store 202 and generates variations of those rules. The network design modifier 205 includes an input for receiving an initial network design, or the basis of a network design (for example a list of sites suitable for locating network nodes), and for receiving rules from the rule generator 203. The network design modifier 205 applies those rules to, in the first instance, the initial network design and subsequently, to a modified network design, to make modifications according to those rules. The network simulator 201 includes an input for receiving a set of traffic requirements and for receiving network designs from the network design modifier 205. The network simulator 201 simulates operation of each received network design using the received traffic requirements and calculates at least one predetermined measure of network performance or network cost for the particular design. The evaluator 207 compares different network designs on the basis of respective performance and cost data received from the simulator 201 and identifies those designs that appear to be most favourable, for example the least expensive to implement. The evaluator 207 also notes the particular rules that were involved in generating the most favourable network designs and outputs those designs and associated rules, in particular passing references to the most effective rules to the rule generator 203 to trigger subsequent use of those rules or storage in the rule store 202.

Network Simulator 201

Many telecommunications network management and design problems require the simulation of a communications network in order to assess the "quality" of a given network arrangement. The network simulator 201 of this embodiment allows network devices to be combined in numerous ways. For instance, nodes, links between nodes and capacities of the links can all be manipulated, and routing tables, which determine routing strategies within the network, can be generated. Routing strategies can be "plugged" into a network device (node), and the nodes include specifications for parameters such as speed at which traffic can be routed through the node, size and configuration of data queues and the physical space required to accommodate the node.

The network simulator 201 includes a traffic generator 201a, which can input a traffic profile—a simulated timetable of traffic events—to the network simulator 201, and can operate in accordance with a flexible event-driven model and schedule. Simulation of traffic can involve the use of a probability distribution function (Poisson distribution—used to model circuit switched traffic, so maybe not so relevant here) or some other algorithmic process (e.g. fractional Brownian motion, chaotic maps and other self-similar pattern generators) that captures the observed structure in the data or models the generating mechanism. In some cases real data may be available, in which case the generator is able to load and use this data directly.

The traffic generator 201a produces events in accordance with a predetermined traffic profile. The events comprising the traffic profile are generated when, for example, a user requests a connection or when packets of data arrive. These events typically do not occur in isolation but are constrained and triggered by other events—e.g. a high-level event could trigger a cascade of other events with the eventual result being the generation of a call or data. For example when a dial-up call cannot be routed directly to a core node 101a, the call is routed via the PSTN. In this situation a data call over the PSTN requires simulating. A number of events are important for this simulation, for example, the dial request, the duration of the call and the arrival time of data packets for that call.

Figure 3:
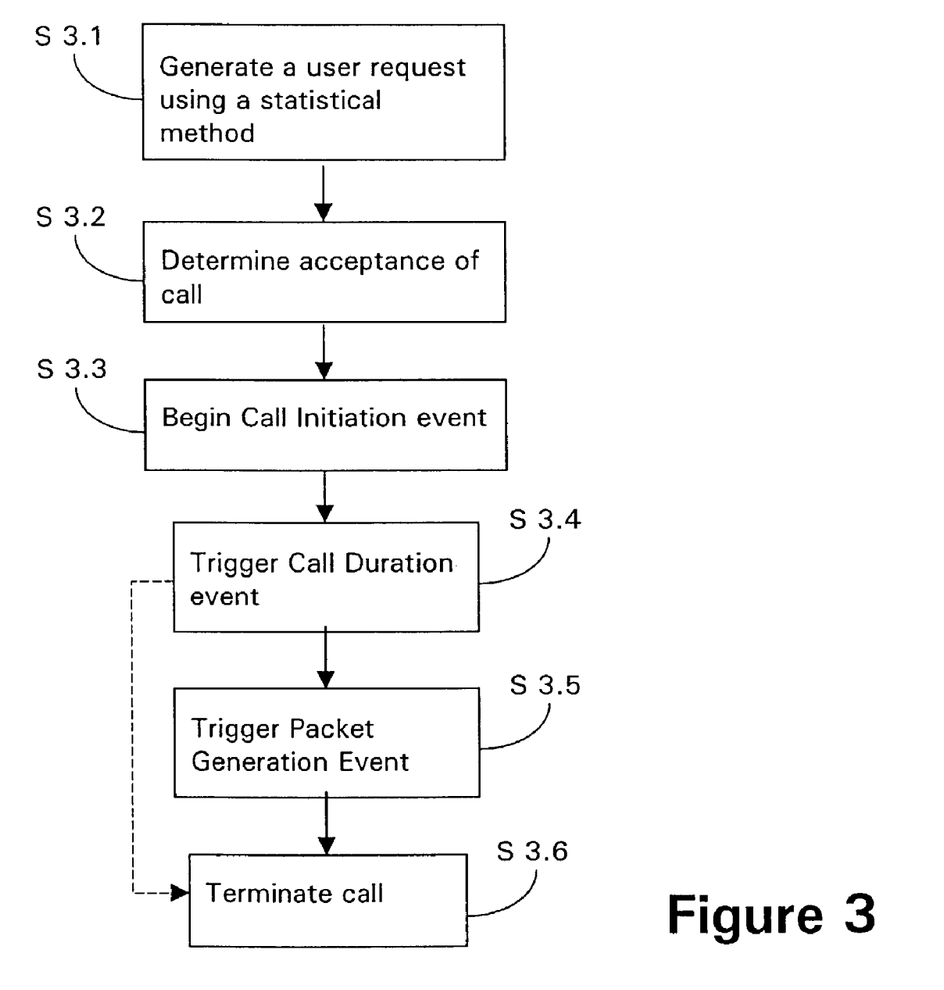
FIG. 3 is a flow diagram showing the steps involved in generating traffic by a network simulator forming part of the apparatus of FIG. 2.

Referring to FIG. 3, a user request S 3.1 may be generated via a Poisson distribution and the acceptance of a call S 3.2 is likely to be determined by conditions in the simulated network. Once a call has been accepted, a call initiation event begins S 3.3. The call initiation event then triggers a call duration mechanism S 3.4, which may generate a call termination event S 3.6 for sometime in the future using, for example, a heavy-tailed distribution. The call initiation event also triggers S 3.5 a packet generation mechanism, which is terminated by the call termination event. In between the call initiation and call termination, the packet generation mechanism is arranged to generate self-similar packet streams that are fed into the simulated network.

The general mechanism for transferring traffic events between network devices in the simulated network includes a combination of the following:

a. The traffic generator 201a produces (software) events that can be listened to by any of the network devices in the simulated network;

b. The traffic generator 201a is arranged to receive device-dependent data and makes decisions on routing of traffic based on the ability, or otherwise, of a network device to accept data.

The call initiation event on an IP node is dependent, at least in part, on the number of free ports at the node 101a. While a node 101a has one or more free ports, those ports listen for incoming call requests; however, once all of the ports are occupied, the node is working at full capacity, and cannot accept any more data. In the latter situation the traffic generator receives the status of that node and does not send a request for a call set-up until the node has a free port again.

Packet switched networks include data from different sources, each potentially transmitting data via different protocols. This has the potential to create a range of different behaviours at the packet level, each of which could be modelled by a dedicated protocol-type component. Thus the traffic generator is arranged to model traffic at an application level with, for example, www, ftp and telnet traffic modelled separately; or at a user level, with different user characteristics creating different demands; or at a protocol level with separate UDP and TCP traffic sources.

The network simulator 201 makes use of both graph space and Cartesian space. The former allows the logical topology of the network to be defined and the latter allows network devices to be placed at precise geographical locations and thus provides information regarding the geographical proximity of nodes and other network equipment. This information is required by the network design modifier 205 to make decisions about the placement of new network devices (see below).

Figure 4:
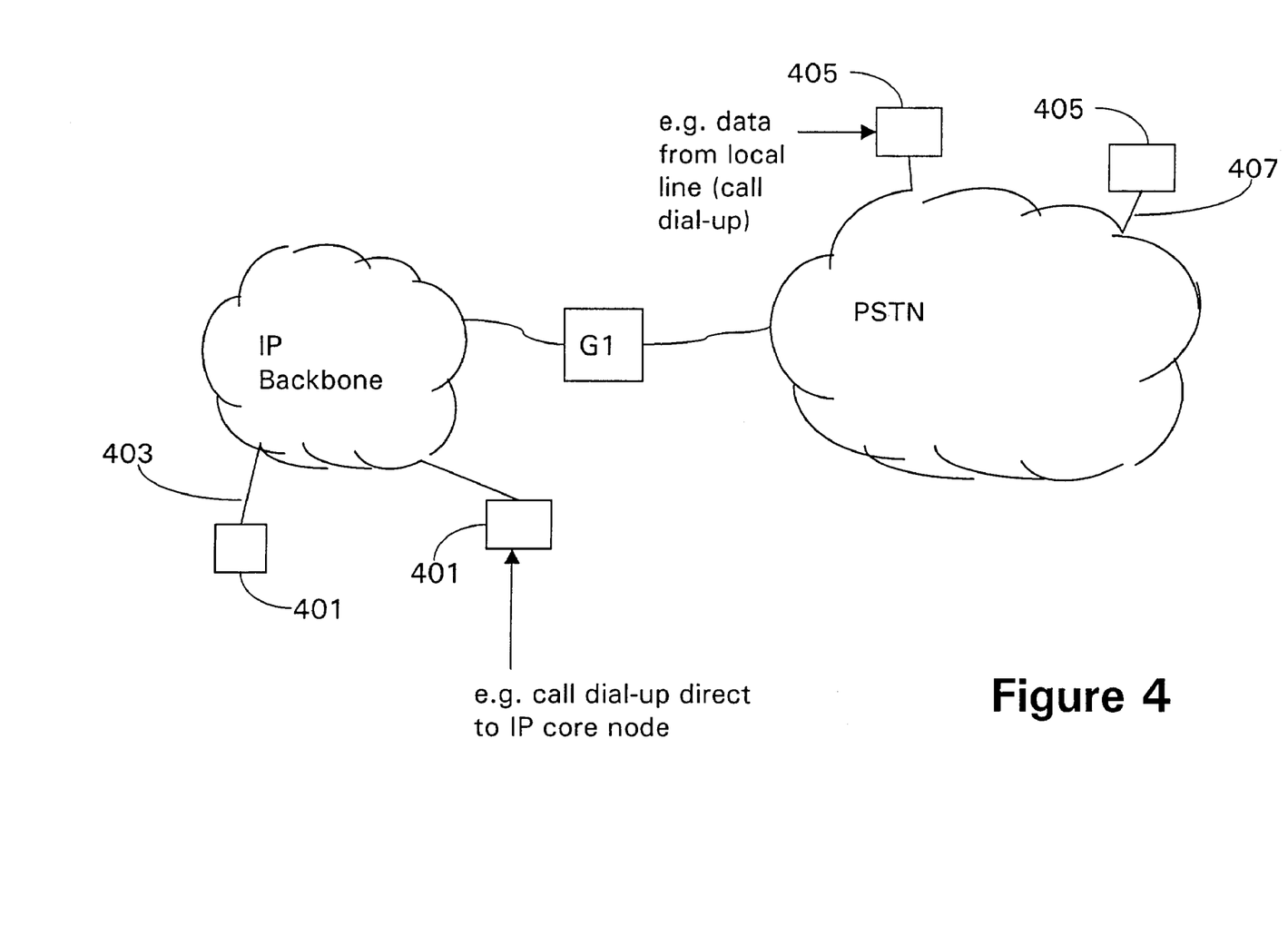
FIG. 4 is a schematic diagram showing the topology of the network simulated by the network simulator forming part of the apparatus of FIG. 2.

As shown in FIG. 4, the topology of the simulated network includes IP network nodes 401 and links 403 and PSTN (Public Switched Telephone Network) nodes 405 and links 407, and the PSTN is interconnected with the IP network by means of Gateway G1.

The network planning tool 200 evaluates network designs for quality of service and costs incurred. This includes quantifying both the cost of any additional hardware and the quality of service that has been achieved for a predetermined traffic profile.

Figure 5:
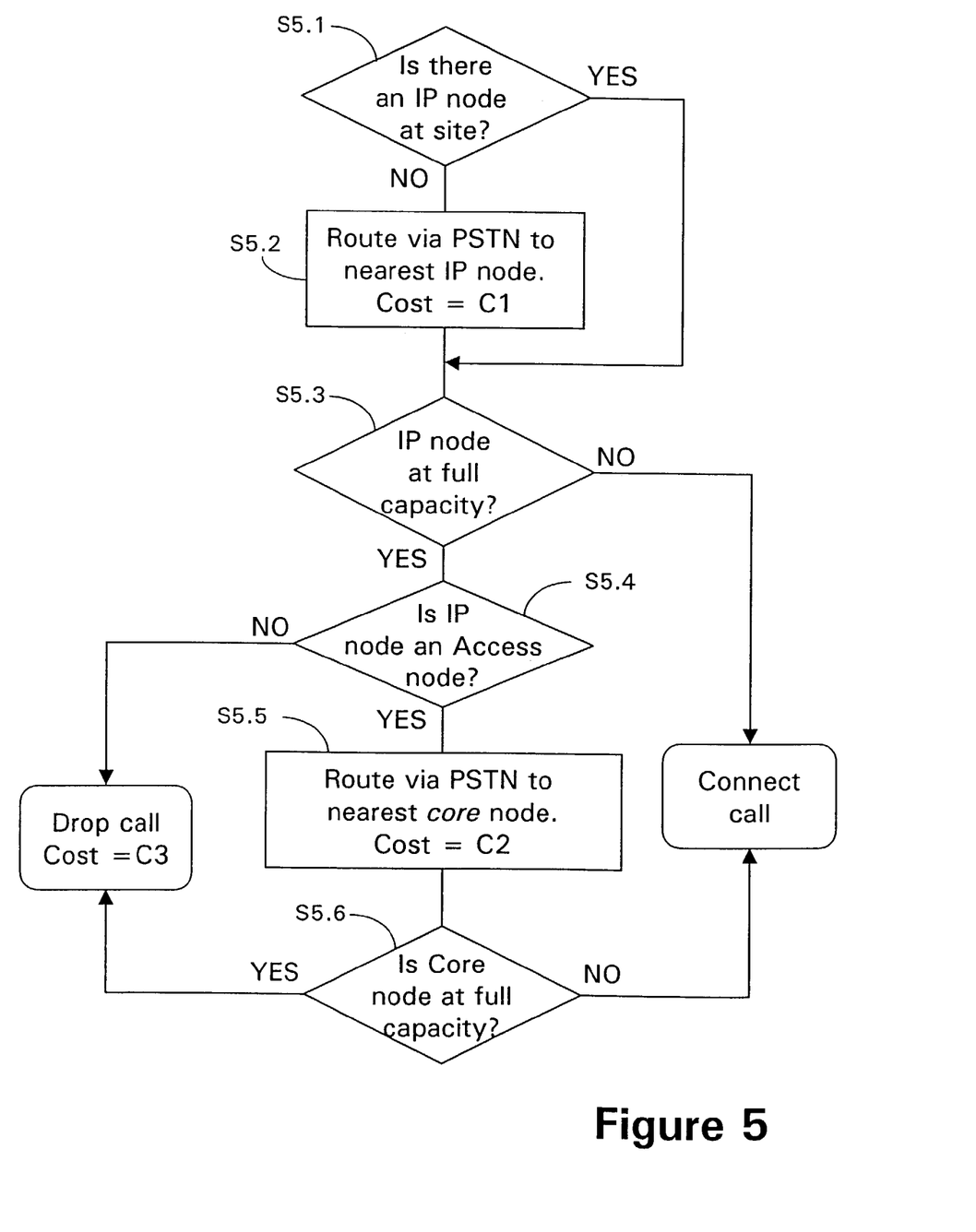
FIG. 5 is a flow diagram showing at least part of the costs incurred in modifying a network arrangement according to the present invention.

One way in which the quality of service can be quantified is by identifying the number of dial-up calls that the network failed to establish, and associating a cost with the identified failed calls. If there is demand for a dial-up call at a site, but there are no co-located IP nodes, the network simulator 201 routes the call to a nearest IP access or core node via a PSTN node (shown in FIG. 4) on the site; each dial-up call routed this way incurs a particular cost. If the dial-up call is routed to an access node that has no spare capacity to accept the call, the call is routed, via PSTN, to the closest core node; this additional routing incurs a yet higher cost. The network simulator 201 therefore maintains a record of the way in which calls are processed; for example, and with reference to FIG. 5, the network simulator 201 can typically be expected to perform the following analysis and record the results of the analysis:

S 5.1 Is there an IP node available on the site? If YES proceed to S5.3 to check capacity. If NO, go to S 5.2

S 5.2 Route the call via the PSTN to the geographically nearest IP node. Set cost to C1

S 5.3 Is the IP node at full capacity? If NO, Connect Call with cost C1. If YES, go to S 5.4

S 5.4 Is the IP node an Access node? If NO, Drop Call and set cost to C3. If YES, proceed to S 5.5

S 5.5 Route the call via the PSTN to the nearest Core node. Set the cost to C2

S 5.6 Is the Core node at full capacity? If YES, Drop Call and set cost to C3. If NO, Connect Call with cost C2.

Thus dial-up calls are routed via the PSTN until an available entry into the IP network is found. If the call reaches one of the core IP nodes and a call still cannot be established, the call is dropped. Note that when a dial-up call fails, this is typically because the nodes receiving the call are operating at full capacity.

Rule Generator 203

The rule generator 203 generates rules that are used in the planning of network growth. Rule store 202 stores the basic syntax of the rules, for access by the generator 203. The rules take account of the demand at a site and the proximity of other nodes, e.g. (X and Y are parameters):

If (Demand>X) AND (Distance to Nearest Node>Y)
    THEN (ADD an access node)    (R1)

In order to distinguish the significance of one parameter from another, scaling parameters $\lambda, \theta$ can be applied. These scaling parameters weight the relative contribution of demand and distance, so that the factor that is of most importance (having a higher weight) dominates the evaluation of R1. When R1 includes the scaling parameters, R1 can be expressed as:

(Demand−$X$)×$\lambda$, +(Distance to Nearest Node−$Y$)× $\theta$=$P$

Where if P>0 THEN (ADD an access node)

Typically the rule generator 203 outputs between 15 and 25 variants of each rule—i.e. for each rule the values of the parameters X, Y, $\lambda, \theta$ are assigned between 15 and 25 different values, thereby generating 15-25 variations of the rule. All of these variations are input to network design modifier 205, and are evaluated by evaluator 207 as described below.

Rule R1 is applied equally to all of the sites, but different rules could be used for different sites, and different conditions (i.e. other than demand and distance) could be used to characterise the rules. For example, different geographical areas, such as London, could require special consideration. In the case of London, where demand is proportionately higher than other parts of the country, it is likely that a special set of rules would be applicable to London sites.

In addition to adding nodes, rules could be added that control the deletion of nodes, so that if demand were to fall below a predetermined threshold at a site, nodes would be deleted at that site.

Selecting, or altering, values for the parameters of the rules can involve use of a Genetic Algorithm (GA), or another suitable search algorithm. It would be clear to one with ordinary skill in the art that a range of suitable search algorithms could be used for this purpose, and selection of a suitable strategy is determined by the ability of the strategy to search a given space, which in this embodiment is given by the representation of the problem. Alternatives to using a GA include a randomiser, an evolutionary strategy, where the mutation rate co-evolves with the solution and there is no population, or a local search method. The operating parameters for a GA are likely to be determined by computation overheads and the nature of the problem, so that the population size is restricted only by computational overheads, and a mutation rate is selected dependent on the form of the problem (the genome). Crossover, as a means for generating changes within the population of solutions, is optional. For the example rule R1 given above, the parameters of the rule R1 can be encoded into a chromosome; specifically each of X, Y, $\lambda, \theta$ is represented using a 5-bit binary string, producing a chromosome of 20 bits. The parameters may be represented as real values with assigned ranges or they may be represented as binary strings. In the former case, each of the parameters is assigned a minimum and maximum value and the 5-bit representation is quantised into 32 levels, for example:

X (demand): 0 to 1500,

Y (distance): 0 to 50 (the maximum possible distance between sites in the simulation)

$\lambda, \theta$ (weighting parameters): 0 to 5.

As an example of a suitable search strategy, rule generator 203 can use the genetic algorithm described in *Adaptation in Natural and Artificial Systems*, by John H. Holland, published by MIT Press, 1994, with roulette wheel selection, a population size of 20, a per-bit mutation rate of 0.01 and single-point crossover rate of 0.7 to alter the parameters in the rules.

As described above, between 15 and 25 different values of parameters X, Y, $\lambda, \theta$ are generated and evaluated for each rule, so that, for each rule there are 15-25 network arrangements and a corresponding number of network evaluations. In a first arrangement, the rule generator 203 modifies each of these parameter values so that a further 15 to 25 variations, each based on their original values, of the rule R1 are generated. In a second arrangement, only the parameter values that yielded the lowest cost are selected, and these parameter values are used to generate a further 15 to 25 variations. Other variations of selection schemes, based on information gathered from the evaluator 207, are possible.

Network Design Modifier 205

Figure 6:
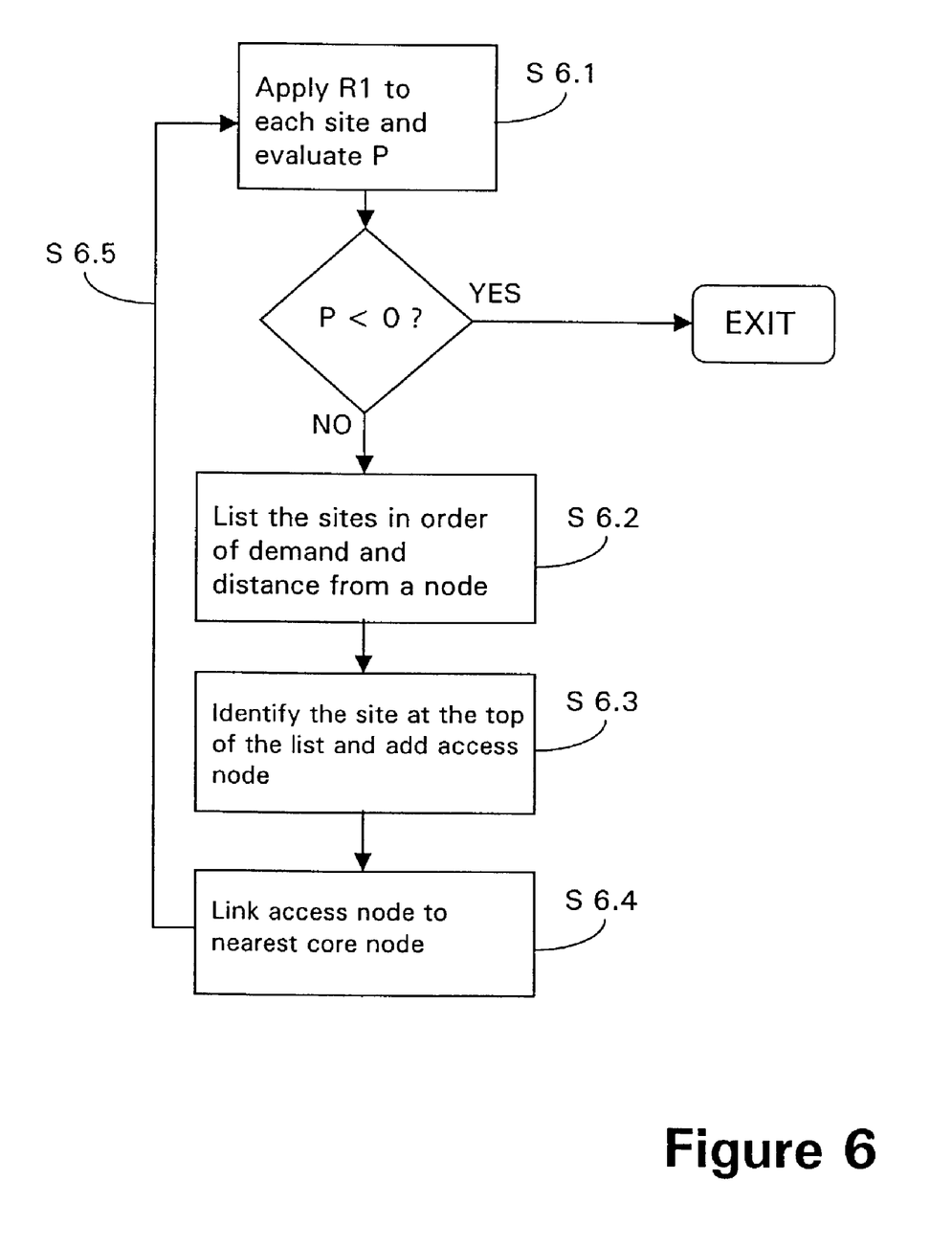
FIG. 6 is a flow diagram showing the processes involved in modifying a network arrangement according to the present invention.

Network design modifier 205 applies the rules in an iterative manner in accordance with a predetermined procedure and thereby modifies the topology of the network. The network design modifier 205 receives data relating to each site in the form of an initial network design, so that the demand and distance data is known. The procedure is described in FIG. 6 and comprises the following steps (references to R1 apply to all of the variations of R1):

S 6.1 Apply R1 to each site. If P<0, Exit, else go to Step S 6.2;

S 6.2 Note sites where P>0, and list the sites in order of demand and distance from a node (i.e. highest values of P at the top);

S 6.3 Identify the site at the top of the list and send an instruction to the network simulator 201 to add an access node to that site.

S 6.4 Instruct the network simulator to link the added node to the nearest core node;

S 6.5 Return to step S 6.1

For situations where there is a plurality of rules, and where different rules apply to different sites, it is possible that the procedure outlined above may be stuck in an infinite loop. In this case suitable additional termination criteria is required.

Evaluator 207

The record maintained by the network simulator 201, which documents the way in which calls are processed, is input to evaluator 207. Evaluator 207 then reads the various costs incurred when trying to set up calls, and evaluates the overall cost associated with the network. Each new access node incurs cost C4; and each link that results from the addition of a new node between access node and core node incurs cost C5. The actual values of the costs C1-C5 (C1, C2, C3 being the costs incurred in accordance with FIG. 5) are arrangement specific, and are measured in relative terms, such that neither the absolute values, nor the units used, are important. In terms of orders of magnitude, the cost of an access node (C4)=800; the cost of a link (C5)=25 per unit length, having a maximum length set to 50 units; the cost of each dropped call (C3)=10 and; the cost of each individual PSTN routing (C1, C2)=5.

The cost associated with a network design is input to the rule store 202, and stored as a performance measure for the corresponding rule, or particular form of the corresponding rule (e.g. parameters characterising a rule). The rule generator 203 thus has access to a performance measure for rules and/or particular forms of the rules, and the performance measure is used to identify which rules to use as a basis for generation of new rules.

In summary, the present embodiment applies a genetic algorithm to generate a plurality of parameter values, and thus rule conditions. These rule conditions are used to generate a plurality of modified network arrangements, as described with reference to FIG. 6, and each of these network arrangements are evaluated to establish the costs associated therewith. The evaluation process accounts for the modification of the network arrangement by addition and/or deletion of network devices. Furthermore by factoring in dropped packets and packets routed via the PSTN (FIG. 5), the evaluation process additionally accounts for the quality of service provided by the network. Thus the output of the evaluation (network cost) can be used to compare network arrangements.

Implementation:

The network planning tool 200 described above can be built and run on the "Eos" evolutionary and ecosystem research platform, which is a "plug and play" design environment implemented using the Java™ programming language. Further details can be found in "Eos, an Evolutionary Toolkit in Java", Erwin Bonsma, presented at PECTEL 4, Colchester, England, December 1999.

The processes carried out by the network design modifier 205, the evaluator 207 and the rule generator 203 involve computationally intensive calculations. Multiple computers can be used to distribute the workload to allow simulations to be distributed over multiple processors. Two mechanisms can be used internally within Eos to support this parallelism: Java™ RMI (remote method invocation) or the Voyager distributed agent toolkit (ObjectSpace. Voyager ORB. WWW: http://www.objectspace.com/products/prodVoyager.asp). These mechanisms can be used to distribute the processing carried out by the network planning tool 200 over a 36-processor Beowulf cluster of PCs running under the Linux operating system (Wollesen, E. A; Krakowiak, N; and Daida, J. M. 1999, Beowulf Anytime for Evolutionary Computation. In *Late breaking papers at GECCO* 1999. 298-304. Orlando, Fla. GECCO 1999).

Additional Details and Modifications:

The rule generator 203 can be arranged to co-operate with means for adaptively selecting both rules and parameters of the rules. In particular the selection can involve use of a genetic algorithm, or similar. For example, suppose each rule can take one of 10 different forms, and that each of those forms can be represented by a number between 1 and 10 (so there is a look-up table between the rule form and numbers between 1 and 10). If there is a plurality of rules, a representation of each rule (i.e. a number between 1 and 10) can occupy a gene in a chromosome. A genetic algorithm can then be applied to that chromosome, so that the gene values change. Depending on the gene value, (i.e. number between 1 and 10), a particular form of each of the rules will be used, and this defines the selection of rules to be applied for network design. The same approach could be applied to actual selection of rules themselves—the number between 1 and 10 could represent 10 different rules, so that the value of the gene in the chromosome identifies which of the rules are to be used.

As will be understood by those skilled in the art, the invention described above may be embodied in one or more computer programs. These programmes can be contained on various transmission and/or storage mediums such as a floppy disc, CD-ROM, or magnetic tape so that the programmes can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A network designing tool for use in designing at least a portion of a communications network, said tool comprising:
   an input for receiving an initial network design and a set of traffic requirements;
   a store for storing at least one network design rule;
   a rule generator for generating a population of rule sets, each rule set having an identity, and each rule set comprising at least one network design rule;
   a network modifier for applying rule sets generated by the rule generator to create at least one modified network design;
   performance measurement means for calculating at least one measure of network performance in respect of a modified network design when carrying traffic as defined by an input set of traffic requirements; and
   an evaluator for assessing modified network designs using respective performance measures calculated by the performance measurement means, for selecting at least one preferred network design satisfying predetermined performance criteria and for identifying a respective rule set used by the network modifier to create said at least one preferred network design;
   wherein the rule generator is arranged to receive, from the evaluator, the identity of at least one rule set used to create a preferred network design and to generate a new population of rule sets comprising rules derived from said at least one rule set, and wherein the network modifier is arranged to apply rule sets from said new population of rule sets to create further modifications of said at least one preferred network design for input to the performance measurement means and for evaluation by the evaluator.

2. A network designing tool as in claim 1, wherein a network design rule comprises at least one condition portion and at least one action portion with at least one of said portions being defined in terms of at least one variable parameter, and wherein the population of rule sets generated by the rule generator includes rules characterized in having different values assigned to said at least one variable parameter.

3. A network designing tool as in claim 2, wherein the network modifier is arranged to test each condition portion of a rule in a rule set generated by the rule generator and to apply only those rules in the rule set to modify aspects of the network design for which each said rule condition is satisfied.

4. A network designing tool as in claim 2, wherein:
   the rule generator is arranged to generate a representation of each network design rule in a rule set, the representation comprising a binary bit string of predetermined length, the assigned value of each variable parameter of the represented network design rule being represented by a predefined sub-section of the bit string, and
   the population of rule sets comprises a set of said binary bit strings in which selected bits have been altered.

5. A network designing tool as in claim 4, arranged to operate a genetic optimization procedure for evolution of a network design, wherein the rule generator is arranged to generate the new population of rule sets at each iteration of the procedure comprising rules derived from said at least one rule set using genetic operators to alter bit values in a bit string representation of rules in said at least one rule set.

6. A network designing tool as in claim 1, wherein a rule comprises a plurality of condition portions, at least one action portion and a variable weighting parameter associated with each of said plurality of condition portions, and wherein rule sets of said population of rules sets generated by the rule generator comprise rules having different values assigned to said variable weighting parameter.

7. A network designing tool as in claim 6 wherein:
   the network modifier is arranged to test each condition portion of a rule in a rule set generated by the rule generator and to apply only those rules in the rule set to modify aspects of the network design for which each said rule condition is satisfied; and
   the network modifier is arranged, when testing each condition portion of a rule, to use respectively assigned weighting parameter values to calculate a measure of the extent to which the weighted rule condition portions are satisfied in respect of a network design to be modified and to modify the network design using only those rules in the rule set for which the weighted rule conditions are most strongly satisfied.

8. A network designing tool as in claim 6, wherein:
   the rule generator is arranged to generate a representation of each network design rule having the variable weighting parameter associated with a condition portion of the rule, the representation comprising a binary bit string of predetermined length, the assigned value of the weighting parameter being represented by a predefined sub-section of the bit string, and the population of rule sets comprises a set of said binary bit strings in which selected bits in the weighting parameter sub-section have been altered.

9. A network designing tool as in claim 1, wherein:
   a rule set includes at least one fixed rule and wherein the rule generator is arranged to generate a representation of a fixed rule, the representation comprising a binary bit string of predetermined length for representing a distinct rule identifier assigned to the rule, and
   the population of rule sets comprises a set of said binary bit strings in which selected bits have been altered to identify different rules.

10. A network designing tool according to claim 1, wherein:
    the population of rule sets generated by the rule generator comprises a single rule set, and
    the evaluator compares the performance of a first modified network design created by application of said single rule set with the performance of a second modified network design generated by an earlier rule set and retains one of said first and second modified network designs as the preferred network design using respective performance measures calculated by the performance measurement means.

11. A network designing tool as in claim 1, wherein the at least one modified network design includes the relocation, addition or deletion of at least one communication network node.

12. A network designing tool as in claim 1, wherein the at least one modified network design including relative respective locations of plural nodes, and links between nodes.

13. A method of designing at least a portion of a communications network, the method comprising:
(i) receiving an initial network design comprising at least an identity of a site for locating a network node;
(ii) receiving predetermined traffic requirements relating to a network to be designed;
(iii) receiving a rule set containing at least one rule for modifying a network design, said at least one rule comprising at least one condition portion and at least one action portion with at least one of said portions being defined in terms of at least one variable parameter;
(iv) generating an initial population of rule sets including rules characterized in having different values assigned to said at least one variable parameter;
(v) for each rule set in said population of rule sets, generating a corresponding modified network design by applying each rule from the rule set to components of the initial network design for which the respective rule conditions are satisfied;
(vi) calculating at least one measure of network performance in respect of each modified network design generated at step (v) when carrying traffic as defined by traffic requirements received at step (ii);
(vii) evaluating the modified network designs from step (v), assessing them on the basis of said at least one respective measure of performance from step (vi) to identify at least one preferred network design and identifying the corresponding network design rules used to create said at least one preferred network design in step (v);
(viii) generating a new population of rule sets, derived from at least one network design rule identified in step (vii);
(ix) repeating steps (v) to (viii), wherein at step (v) said at least one preferred network design from step (vii) is modified in place of the initial network design.

14. A method as in claim 13, wherein the corresponding modified network design includes the relocation, addition or deletion of at least one communication network node.

15. A method as in claim 13, wherein the corresponding modified network design including relative respective locations of plural nodes, and links between nodes.

16. A method of generating a design for at least one communications network, said method comprising:
(i) inputting an initial network design comprising at least an identity of a site for locating a network node;
(ii) inputting predetermined traffic requirements relating to a network to be designed;
(iii) inputting a rule set containing at least one rule for modifying a network design, said rule set including at least one rule comprising at least one condition portion and at least one action portion with at least one of said portions being defined in terms of at least one variable parameter;
(iv) generating an initial population of rule sets including rules characterized in having different values assigned to said at least one variable parameter;
(v) for each rule set in said population of rule sets, generating a corresponding modified network design by applying each rule from the rule set to components of the initial network design for which the respective rule conditions are satisfied;
(vi) calculating at least one measure of network performance in respect of each modified network design generated at step (v) when carrying traffic as defined by traffic requirements input at step (ii);
(vii) evaluating the modified network designs from step (v), assessing them based on said at least one respective measure of performance from step (vi) to identify at least one preferred network design and identifying the corresponding network design rules used to create said at least one preferred network design in step (v);
(viii) generating a new population of rule sets, derived from at least one network design rule identified in step (vii);
(ix) repeating steps (v) to (viii), wherein at step (v) said at least one preferred network design from step (vii) is modified in place of the initial network design, until at step (vii) at least one preferred network design is identified satisfying predetermined performance criteria.

17. A method as in claim 16, further including:
(x) storing the network design rules identified at step (vii), used to create the at least one preferred network design identified at step (ix), for use as input at step (iii) in a further operation of the method.

18. A method as in claim 17, wherein the corresponding modified network design includes the relocation, addition or deletion of at least one communication network node.

19. A method as in claim 16, wherein the corresponding modified network design includes the relocation, addition or deletion of at least one communication network node.

20. A method as in claim 16, wherein the corresponding modified network design including relative respective locations of plural nodes, and links between nodes.

* * * * *